United States Patent
Hurwic et al.

(10) Patent No.: US 7,959,237 B2
(45) Date of Patent: Jun. 14, 2011

(54) BRAKE BOOSTER SUPPLIED BY AN AIR CONDITIONING CIRCUIT

(75) Inventors: Aleksander Hurwic, Paris (FR); Alain Fillon, Croix Chapeau (FR)

(73) Assignee: Robert Bosch GmbH, Stuttgart (DE)

( * ) Notice: Subject to any disclaimer, the term of this patent is extended or adjusted under 35 U.S.C. 154(b) by 1359 days.

(21) Appl. No.: 10/581,836

(22) PCT Filed: Dec. 13, 2004

(86) PCT No.: PCT/FR2004/003272
§ 371 (c)(1),
(2), (4) Date: Jun. 5, 2006

(87) PCT Pub. No.: WO2005/070740
PCT Pub. Date: Aug. 4, 2005

(65) Prior Publication Data
US 2007/0113577 A1    May 24, 2007

(30) Foreign Application Priority Data
Dec. 24, 2003  (FR) .................................... 03 15494

(51) Int. Cl.
*B60T 8/44* (2006.01)
*F16D 65/10* (2006.01)
(52) U.S. Cl. ............. 303/114.3; 188/264 R; 188/264 A; 188/264 AA; 188/264 B; 188/264 D; 138/30; 138/31
(58) Field of Classification Search ............... 303/114.3; 188/264 R, 264 A, 264 AA, 264 B, 264 D, 188/264 F; 138/30, 31
See application file for complete search history.

(56) References Cited

U.S. PATENT DOCUMENTS

| | | | | |
|---|---|---|---|---|
| 2,942,699 A | * | 6/1960 | Eames | 188/71.5 |
| 2,945,566 A | * | 7/1960 | Eames et al. | 188/264 F |
| 2,946,412 A | * | 7/1960 | Jensen | 188/264 F |
| 3,044,582 A | * | 7/1962 | Gold et al. | 188/264 D |
| 3,136,392 A | * | 6/1964 | Rodway | 188/277 |
| 3,265,162 A | * | 8/1966 | Botterill | 188/271 |

(Continued)

FOREIGN PATENT DOCUMENTS
EP    0171585    2/1996
(Continued)

OTHER PUBLICATIONS

English translation of KR 98050853 A, Cho G H et al., Sep. 1998.*

*Primary Examiner* — Bradley T King
*Assistant Examiner* — Mahbubur Rashid
(74) *Attorney, Agent, or Firm* — Michael Best & Friedrich LLP

(57) ABSTRACT

The invention relates to a braking device for a motor vehicle fitted with an air conditioning circuit (K), this braking device comprising a source of fluid (F1) at a relatively high pressure, a source of fluid (F2) at a relatively low pressure, and a pneumatic brake booster (F3) selectively connected to one or other of the sources of fluid (F1, F2).
According to the invention, the source of fluid (F1) at a relatively high pressure comprises a portion (KC1) of the air conditioning circuit (K) that is placed downstream of the air conditioning compressor (K1) and upstream of the air conditioning expansion valve (K2), in one direction of flow (X) of the cooling fluid in the air conditioning circuit (K).

10 Claims, 1 Drawing Sheet

U.S. PATENT DOCUMENTS

| | | | |
|---|---|---|---|
| 3,347,344 A * | 10/1967 | Troy | 188/264 R |
| 5,076,056 A * | 12/1991 | Schmidt et al. | 60/329 |
| 6,305,757 B1 * | 10/2001 | Ohsaki et al. | 303/114.3 |
| 2003/0098011 A1 * | 5/2003 | Natkin et al. | 123/339.17 |

FOREIGN PATENT DOCUMENTS

| | | |
|---|---|---|
| JP | 2003104046 | 4/2003 |
| KR | 98050853 A * | 9/1998 |
| WO | 9835849 | 8/1998 |

\* cited by examiner

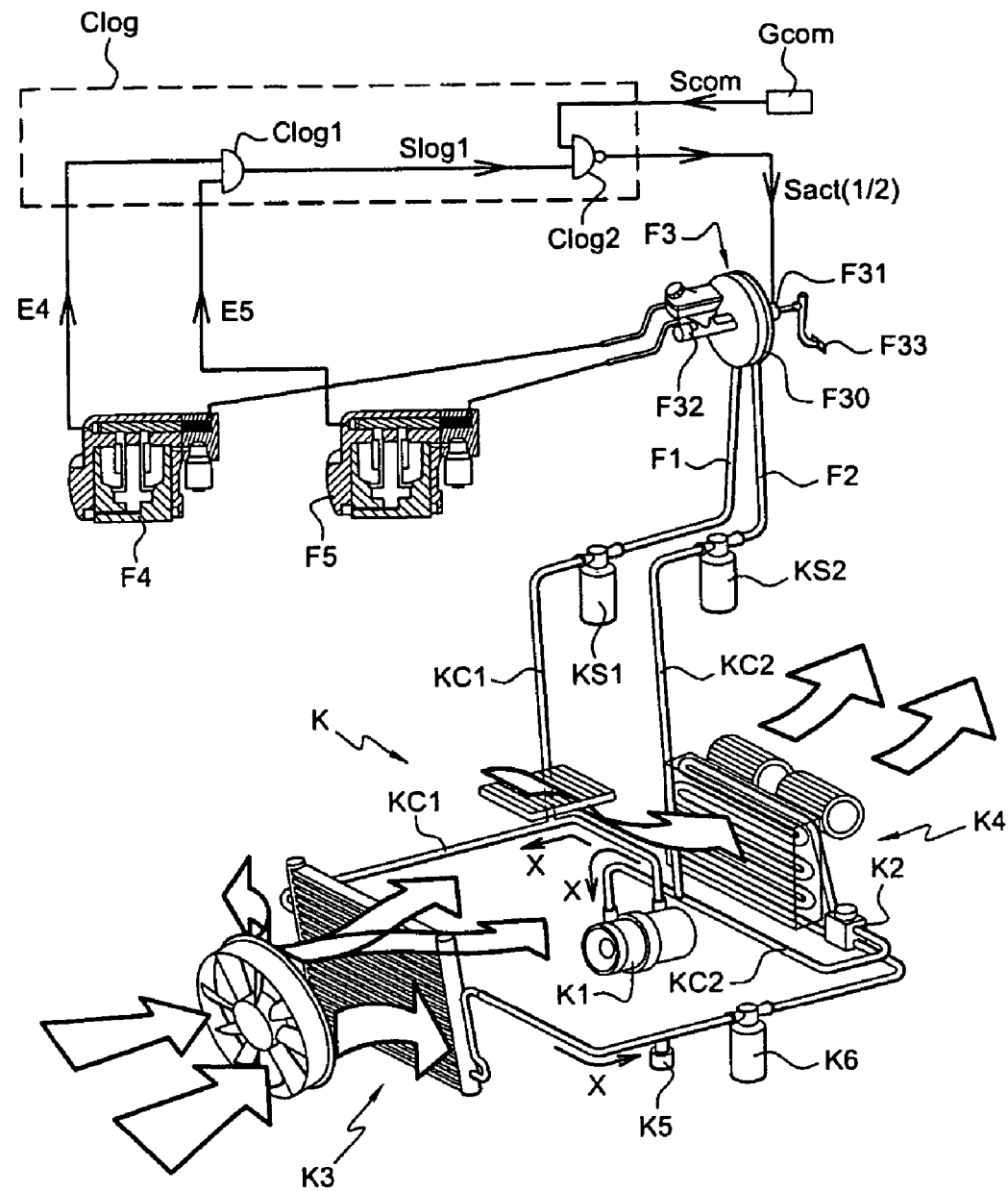

BRAKE BOOSTER SUPPLIED BY AN AIR CONDITIONING CIRCUIT

The invention relates, in general, to the braking techniques applied to motor vehicles.

BACKGROUND OF THE INVENTION

More precisely, the invention relates to a braking device for a motor vehicle fitted with an air conditioning circuit containing a cooling fluid, a compressor and an expansion valve, this device itself including a first source of fluid selectively delivering a gaseous fluid at a relatively high pressure, a second source of fluid selectively delivering the gaseous fluid at a relatively low pressure, and a pneumatic brake booster comprising a variable volume working chamber and a control valve selectively actuated by a first or a second impulse to connect respectively the working chamber to the first or to the second source of fluid.

The motor industry has been evolving for several years in the pursuit of several major objectives, which notably include the search for optimum safety and increased comfort.

This situation leads to having recourse, on current motor vehicles, to an increasing number of new members associated with either safety or comfort.

This evolution is slowed by two other constraints to which the motor industry is subjected, that is the lightening of the vehicles and, correlatively, the reduction in their energy consumption.

SUMMARY OF THE INVENTION

The invention, which relates to this context, has the objective of extending the limits of this delicate compromise.

For this purpose, the device of the invention, furthermore complying with the generic definition given to it by the above preamble, is essentially characterized in that the first source of fluid comprises a first portion of the air conditioning circuit, placed downstream of the compressor and upstream of the expansion valve, in one direction of flow of the cooling fluid in the air conditioning circuit.

Preferably, the second source of fluid comprises a second portion of the air conditioning circuit, placed downstream of the expansion valve and upstream of the compressor in the direction of flow of the cooling fluid.

Advantageously, the first portion of the air conditioning circuit may comprise a high pressure accumulator, the second portion of the air conditioning circuit being able, for its part, to comprise a low pressure accumulator.

The booster may also have an active valve, of the type described for example in patents U.S. Pat. No. 5,172,964, FR-2 724 356, or EP-A-0 171 585, and capable of being controlled by a signal, usually of an electric nature, to cause the actuation of the booster.

In this case, the valve is therefore sensitive to an actuation signal having selectively at least a first state or a second state, and the first and second states of this actuation signal constitute respectively the first and second impulses for the valve.

In the conventional situation in which the braking device comprises at least two brake motors moved by the booster and selectively adopting an active state or a passive state, this device may also comprise a control signal generator suitable for selectively producing a control signal, and a signal combining circuit, this signal combining circuit delivering to the valve the actuation signal in its first state in response to the simultaneous detection of the control signal and of the passive state of the brake motors.

Such an arrangement thus makes it possible to provide the device of the invention with a parking brake function with auxiliary energy, for example electric.

Other features and advantages of the invention will clearly emerge from the description with reference to the appended single drawing.

BRIEF DESCRIPTION OF THE DRAWINGS

The single FIGURE is a schematic illustration of a brake system according to the present invention.

Detailed Description of the Drawings

As previously specified, the invention relates to a braking device for a motor vehicle fitted with an air conditioning circuit K.

Conventionally, such an air conditioning circuit comprises a pipe in which flows a cooling fluid that is gaseous at ambient temperature and pressure, a compressor K1, an expansion valve K2, a condensing and calorie extraction system K3, an evaporation and frigorie extraction system K4, a pressure switch K5 and a fluid reserve bottle K6.

In the pipe of this circuit K, the cooling fluid flows in a direction of flow X and according to a generally decreasing change in its pressure and its temperature, from a first portion KC1 of the air conditioning circuit K, placed downstream of the compressor K1 and upstream of the expansion valve K2, to a second portion KC2 of the air conditioning circuit, placed downstream of the expansion valve K2 and upstream of the compressor K1.

The braking device includes, in a known manner, two sources of fluid F1 and F2, delivering as required a gaseous fluid at pressures respectively relatively high and relatively low, and a pneumatic brake booster F3.

The booster comprises at least one variable volume working chamber F30 and a control valve F31 whose role is to connect the working chamber F30 to the high pressure source of fluid F1 or to the low pressure source of fluid F2 in response respectively to a first or a second impulse that it receives, for example in the form of antagonistic actuation and return forces acting on a brake pedal F33 and/or in the form of electric control signals.

According to an essential aspect of the invention, the high pressure source of fluid F1 comprises the portion KC1 of the air conditioning circuit K which, in the direction of flow X of the cooling fluid inside the air conditioning circuit K, is placed downstream of the compressor K1 and upstream of the expansion valve K2, and which advantageously itself includes a high pressure accumulator KS1.

Furthermore, the low pressure source of fluid F2 preferably comprises the portion KC2 of the air conditioning circuit which, in the direction of flow X of the cooling fluid, is placed downstream of the expansion valve K2 and upstream of the compressor K1, and which advantageously itself includes a low pressure accumulator KS2.

As a variant, a booster is used with a single chamber closed by a movable wall subjected on one of its faces to atmospheric pressure and on its other face to the pressure that exists in the chamber. The valve connects the single chamber to the high pressure source of fluid F1 or to the low pressure source of fluid F2 depending on the desired intensity of braking.

In the preferred case in which the valve F31 of the booster F3 is active, it adopts, for example, a first state, in which it connects the working chamber F30 to the high pressure source F1, in response to receiving an actuation signal Sact placed in a first state Sact1, while it adopts a second state, in which it connects the working chamber F30 to the low pressure source F2, in response to receiving the actuation signal Sact placed in a second state Sact2.

In the most conventional case, a braking device that can be used in the context of the invention comprises two hydraulic rear brake motors, F4 and F5, that are operated by the booster F3 acting on these motors via a hydraulic master cylinder F32.

The brake motors F4 and F5 thus adopt as required an active state corresponding to a mechanical locking of the parking brake associated with each motor, or a passive state corresponding to an unlocking of the parking brake associated with each motor, and including, for example, respective sensors capable of sending respective signals E4 and E5, for example electric signals, reporting these various states.

In an advantageous embodiment, the device of the invention may also comprise a control signal generator Gcom and a signal combining circuit Clog.

The circuit Clog itself comprises an AND logic gate Clog1 and a NOT(AND) logic gate Clog2.

The AND logic gate Clog1 receives the state signals E4 and E5 and generates an intermediate signal Slog1.

The NOT(AND) logic gate Clog2, that receives the intermediate signal Slog1 and a control signal Scom sent by the control signal generator Gcom, produces, at the output of the Clog circuit and sent to the valve F31 of the booster F3, the actuation signal Sact in its first state Sact1 in response to the simultaneous detection of the control signal Scom and of the passive state E4p and E5p of the brake motors F4 and F5.

The operation of the device as described hitherto is as follows.

When he desires to immobilize the vehicle for prolonged parking, the driver of this vehicle triggers the generator Gcom which immediately delivers a control signal Scom.

The brake motors F4 and F5 then being supposed to be idle, the state signals E4 and E5 are at a low level, as is the intermediate signal Slog1.

The NOT(AND) gate Clog2, that receives the Scom signal at the high level and the Slog1 signal at the low level, delivers the actuation signal Sact in its first state Sact1.

On receipt of the actuation signal Sact in its first state Sact1, the valve F31 connects the working chamber F30 to the high pressure source F1, which causes the actuation of the booster F3 and that of the brake motors F4 and F5.

When the brake motors F4 and F5 have reached their active state, corresponding for example to the mechanical locking of the parking brake, the intermediate signal Slog1 passes to the high level.

Since, in the meantime, the generator Gcom has ceased to produce the control signal Scom, the NOT(AND) gate Clog2 stops delivering the actuation signal Sact in its first state Sact1, as soon as the two brake motors F4 and F5 have locked the parking brake.

However, as soon as the generator Gcom is again actuated by the driver, the signal Scom that it sends causes the gate Clog2 to switch over due to the high level of the signal Slog1, the signal Sact thus placing itself in its second state Sact2, establishing communication between the working chamber F30 and the low pressure source F2, and causing the booster F3 to return to its idle position.

The invention claimed is:

1. A braking device for a motor vehicle fitted with an air conditioning circuit (K) containing a cooling fluid, a compressor (K1) and an expansion valve (K2), including a first source of cooling fluid (F1) selectively delivering a gaseous cooling fluid at a high pressure, a second source of cooling fluid (F2) selectively delivering the gaseous cooling fluid at a low pressure that is lower than the high pressure, and a pneumatic brake booster (F3) comprising a variable volume working chamber (F30) and a control valve (F31) selectively actuated by a first impulse and by a second impulse, the control valve being operable to connect the working chamber (F30) to the first (F1) source of cooling fluid in response to receipt of the first impulse and being operable to connect the working chamber (F30) to the second (F2) source of cooling fluid in response to receipt of the second impulse, characterized in that the first source of fluid (F1) comprises a first portion (KC1) of the air conditioning circuit (K) that is located downstream of the compressor (K1) and is located upstream of the expansion valve (K2) a direction of flow (X) of the cooling fluid in the air conditioning circuit (K).

2. The braking device according to claim 1, characterized in that the second source of fluid (F2) comprises a second portion (KC2) of the air conditioning circuit and is located downstream of the expansion valve (K2) and is located upstream of the compressor (K1) in the direction of flow (X) of the cooling fluid.

3. The braking device according to claim 1, characterized in that the first portion (KC1) of the air conditioning circuit comprises a high pressure accumulator (KS1).

4. The braking device according to claim 2, characterized in that the second portion (KC2) of the air conditioning circuit comprises a low pressure accumulator (KS2).

5. The braking device according to claim 1, characterized in that the valve (F31) is sensitive to an actuation signal (Sact) having selectively at least a first state (Sact1) or a second state (Sact2) and in that the first and second states (Sact1, Sact2) of the actuation signal (Sact) constitute respectively the first and second impulses for the valve (F3I).

6. The braking device according to claim 5, characterized in that it comprises at least two brake motors (F4, F5) moved by the booster (F3) and selectively adopting a mechanically locked state of the parking brake or a passive state without mechanical locking of the parking brake, a control signal generator (Gcom) suitable for selectively producing a control signal (Scom) and a signal combining circuit (Clog), this signal combining circuit delivering to the valve (F31) the actuation signal (Sact) in its first state (Sact1) in response to the simultaneous detection of the control signal (Scom) and of the mechanically unlocked state of the parking brake of the brake motors (F4, F5).

7. The braking device according to claim 2, characterized in that the first portion (KC1) of the air conditioning circuit comprises a high pressure accumulator (KS1).

8. The braking device according to claim 7, characterized in that the second portion (KC2) of the air conditioning circuit comprises a low pressure accumulator (KS2).

9. The braking device according to claim 8, characterized in that the valve (F31) is sensitive to an actuation signal (Sact) having selectively at least a first state (Sact1) or a second state (Sact2) and in that the first and second states (Sact1, Sact2) of the actuation signal (Sact) constitute respectively the first and second impulses for the valve (F3I).

10. The braking device according to claim 9, characterized in that it comprises at least two brake motors (F4, F5) moved by the booster (F3) and selectively adopting a mechanically locked state of the parking brake or a passive state without mechanical locking of the parking brake, a control signal generator (Gcom) suitable for selectively producing a control signal (Scom) and a signal combining circuit (Clog), this signal combining circuit delivering to the valve (F31) the actuation signal (Sact) in its first state (Sact1) in response to the simultaneous detection of the control signal (Scom) and of the mechanically unlocked state of the parking brake of the brake motors (F4, F5).

* * * * *